United States Patent [19]

Shinohara

[11] 4,415,241
[45] Nov. 15, 1983

[54] TESSOR TYPE LENS SYSTEMS FOR FACSIMILE

[75] Inventor: Hiroichi Shinohara, Yokohama, Japan

[73] Assignee: Ricoh Co., Ltd., Tokyo, Japan

[21] Appl. No.: 189,947

[22] Filed: Sep. 22, 1980

[30] Foreign Application Priority Data

Sep. 21, 1979 [JP] Japan .................. 54-121717

[51] Int. Cl.³ .............................. G02B 9/20
[52] U.S. Cl. ................................. 350/476
[58] Field of Search ........................ 350/476

[56] References Cited

U.S. PATENT DOCUMENTS 2,764,063  9/1956  Lange ................... 350/476
4,264,139  4/1981  Maeda ................... 350/476

FOREIGN PATENT DOCUMENTS 1193696  5/1965  Fed. Rep. of Germany ...... 350/476
1261334  2/1968  Fed. Rep. of Germany ...... 350/476

*Primary Examiner*—John K. Corbin
*Assistant Examiner*—Rebecca D. Gass
*Attorney, Agent, or Firm*—Oblon, Fisher, Spivak, McClelland & Maier

[57] ABSTRACT

An improved tessor type lens system for facsimile having a large aperture ratio and a high contrast are provided. The lens system comprises for components between object and image as follows; a first positive meniscus lens element, a second biconcave lens element, a third meniscus shaped doublet. The entire lens system is capable of providing an aperture ratio greater than 90% and a half angle of image of approximately 18° with an f number of 4.5.

1 Claim, 5 Drawing Figures

SPHERICAL ABERRATION
CHROMATIC ABERRATION

ASTIGMATISM (%)
DISTORTION

TESSOR TYPE LENS SYSTEMS FOR FACSIMILE

BACKGROUND OF THE INVENTION

1. Field of the Invention

The present invention relates to a Tessor type lens system for use in a facsimile apparatus having a half angle of image of approximately 18° and an aperture ratio greater than 90% with an f number of 4.5.

2. Description of the Prior Art

The Tessor type lens system has been generally used in the field of photography. However there are several problems in its application to the facsimile system.

One problem is that the photographic lens system which is adapted to infinity in the object distance can not be practically used for the facsimile systems which do not require the lens system to be adapted to infinity in the object distance.

Another problem relates to an astigmatism, since, in the facsimile system, a parallel plane such as translucent contact glass having a certain thickness is disposed between the lens and object, the phenomenum of astigmatism occurs.

Moreover the facsimile lens system is required to have a large aperture ratio as the facsimile system is designed to form an image of relatively narrow range at one particular time in contrast to a wide range in photography.

As a consequence of these problems inherent in the Tessor type lens system, it is extremely difficult to provide high contrast and a large aperture ratio while at the same time correcting various aberrations that exist.

SUMMARY OF THE INVENTION

An object of the present invention is to provide an improved three group, four lens element Tessor type lens system for use in facsimile system with a relatively high contrast and a large aperture ratio while still maintaining a proper balance in correction of various aberrations. This facsimile lens system of the present invention is designed to have a half angle of image of approximately 18° with the proper correction of various aberrations taken into account. The design parameter which characterizes the invention can be as follows;

$1.7 < f/f_2 < 1.9$ $-0.43 < f/f_4 < -0.23$ $1.75 < n_1, 39 < \nu_1 53$ $0.35f < \gamma 1 < 0.50f$ $0.053f < d_2 < 0.079f$ $-1.5f < \gamma_3 < 0.8f$ $0.064f < d_4 < 0.084f$ $-10f < \nu_5 < -5f$ $1.79 < n_4, 35 < \nu_4 < 47$ Wherein $\gamma_i$ represents the radius of curvature of the i-th refractive surface counted from the object side; di represents the i-th axial distance (i.e., airspace or lens thickness) counted from the object side; $n_i$ represents the refractive index with respect to d-line of the i-th glass material counted from the object side; $\nu_i$ represents the Abbe number of the i-th glass material counted from the object side; f represents the focal length of the whole lens system; $f_i$ represents the focal length of the i-th lens surface counted from the object side.

The features of the present invention which are believed to be novel can be best understood, together with further objects and advantages, by reference to the following description, taken in connection with the accompanying drawings.

DETAILED DESCRIPTION OF THE PREFERRED EMBODIMENTS

The following description is provided to enable any person skilled in the optical arts to make and use the invention and sets forth the best modes comtemplated by the inventor of carrying out his invention. Various modifications, however, will remain readily apparent to those skilled in the art, since the generic principles of the present invention have been defined herein specifically to provide an improved Tessor type lens system that can be manifactured in a relatively economical manner.

The derivation of the formulae and the relation set forth herein have been accomplished with the assistance of a computer. The present invention represents the parameters of a compromised balance of acceptable aberrations in a relatively easily manufactured and low cost lens system for utilization in, for example, a facsimile lens system.

Each of the individual lens elements is designated by the letter l and the respective sub-number indicates the position of the lens element consecutively from the object to image side of the lens system. The axial spacing along the optical axis are designated by the letter d and refer to both air spaces and the relative thickness of the lens. The radii of curvatures are designated by letter r. Both the axial spacings d and the radius of curvature r are also designated with submembers to indicate their relative positions from the object to image side of the lens system.

Figure 1:
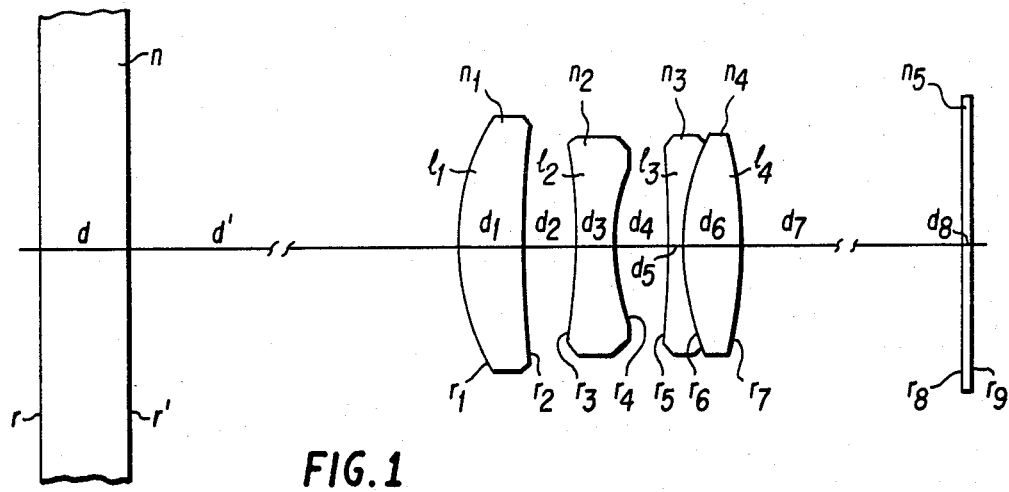
FIG. 1 shows a schematic sectional view of a first embodiment of the present invention.

As disclosed in the schematic cross sectional view in FIG. 1, the improved Tessor type lens system according to the present invention includes three separate lens groups. These lens groups consist consecutively from the object to image side of a first front group including a positive meniscus single lens element convex to the object side; a second group consisting of a biconcave single lens element; and a third group consisting of a meniscus shaped doublet element concave to the object side formed by cementing negative and positive sub elements; r and r'' represent the radii of outer surface and inner surface of document glass respectively Symbols d, n represent a thickness of document glass and refractive index of document glass; d' represents axial spacings between the inner surface of document glass and the surface of the first lens. $\gamma_8$, $\gamma_9$ represent the radii of outer surface and inner surface of safety glass in the light receiving range of solid state imaging sensor, and $n_5$ and $d_8$ represent the refractive index and the thickness of this safety glass respectively.

Symbol d represents axial spacing between lens surface of the most nearest to the image and the outer surface of the above mentioned safety glass;

Symbol $\nu$ and $\nu_5$ represent the Abbe numbers of the document glass and the safety glass respectively. Furthermore m, w and y represent a magnification, half angle of image and height of the object respectively.

The condition (1) defines the refracting power of the first lens. Above the upper limit the image plane becomes positive, and the sum of Petzval becomes too small. Under the lower limit the i image plane becomes too negative.

The condition (2) defines the refracting power of the first lens and the second lens. Above the upper limit the image plane becomes negative, while below the lower limit the chromatic aberration becomes too high.

The conditions (3) and (9) define dimensions of refractive index required to maintain the sum of the Petzval at the level of about 0.18. When the Abbe number is increased above the upper limit, correction of the chromatic aberration becomes considerably insufficient, and there is no glass available to meet the required refractive index below the lower limit. The condition (4) corrects a curvature of the image and a chromatic aberration simultaneously under the condition (1). Above the upper limit the image plane becomes too negative, while under the lower limit the chromatic aberration increases and the contrast becomes small.

The condition (5) defines the angle of image and above the upper limit the angle of image becomes too small, leading to a reduction in the efficiency of the marginal part of the lens, while under the lower limit the efficiency of the central part of the lens is reduced. When the reduction ratio is approximately 1/10 and angle of image is almost 18°, this condition (6) is almost favourable.

The condition (6) relates to the axial chromatic aberration and the chromatic aberration of magnification, whether $\nu_3$ should preferably be negative and large.

Above the upper limit the axial chromatic aberration becomes large and at the same time the difference of chromatic aberration of magnification between the lower height of incidence and the higher height of incidence becomes large, while under the lower limit, the image plane becomes negative all over making the correction of aberration in the lens surface considerably difficult.

The condition (7) together with the condition (5) refers to the correction of distortion. Above the upper limit the distortion becomes too negative, and under the lower limit the distortion becomes too positive.

The condition (8) refers to the correction of the image plane and distortion, wherein above the upper limit, both the image plane and distortion are too positive, and under the lower limit they are negative.

The following Table 1 discloses an embodiment of the present invention.

TABLE 1

Embodiment (1)
1: 4.5, f = 100, m = −1/9.62    ω = 17.6

| | | | | | | |
|---|---|---|---|---|---|---|
| $\gamma$ | | d | 13.158 | n | 1.51633 | $\nu$ 64.1 |
| $\gamma^1$ | | $d^1$ | 1039.145 | | | |
| $\gamma_1$ | 39.474 | $d_1$ | 9.211 | $n_1$ | 1.77250 | $\nu_1$ 49.6 |
| $\gamma_2$ | 394.832 | $d_2$ | 6.711 | | | |
| $\gamma_3$ | −97.368 | $d_3$ | 5.395 | $n_2$ | 1.71736 | $\nu_2$ 29.5 |
| $\gamma_4$ | 34.697 | $d_4$ | 7.369 | | | |
| $\gamma_5$ | −788.105 | $d_5$ | 2.632 | $n_3$ | 1.58144 | $\nu_3$ 40.7 |
| $\gamma_6$ | 47.368 | $d_6$ | 8.158 | $n_4$ | 1.83481 | $\nu_4$ 42.7 |
| $\gamma_7$ | −66.426 | $d_7$ | 84.174 | | | |
| $\gamma_8$ | ∞ | $d_8$ | 1.316 | $n_5$ | 1.77250 | $\nu_5$ 49.6 |
| $\gamma_9$ | ∞ | | | | | | when f equals one, the Petzval coefficiency in the above-mentioned embodiment is as follows:

| | P | S | C | A | D |
|---|---|---|---|---|---|
| $\gamma_1$ | 1.107 | 4.000 | 1.579 | 0.623 | 0.683 |
| $\gamma_2$ | −0.111 | 2.557 | −1.675 | 1.097 | −0.646 |
| $\gamma_3$ | −0.431 | −7.203 | 2.469 | −0.846 | 0.438 |
| $\gamma_4$ | −1.210 | −3.313 | −2.508 | −1.898 | −2.353 |
| $\gamma_5$ | −0.047 | 0.007 | 0.044 | 0.259 | 1.263 |
| $\gamma_6$ | 0.184 | 1.099 | 0.884 | 0.711 | 0.720 |
| $\gamma_7$ | 0.687 | 3.556 | 0.571 | 0.092 | −0.125 |
| | 0.179 | 0.703 | 0.222 | 0.038 | −0.020 | wherein the symbols P, S, C, A and D represent Petzval term, spherical aberration term, chromatic aberration term, astigmatism term and distortion term respectively.

Figure 2:
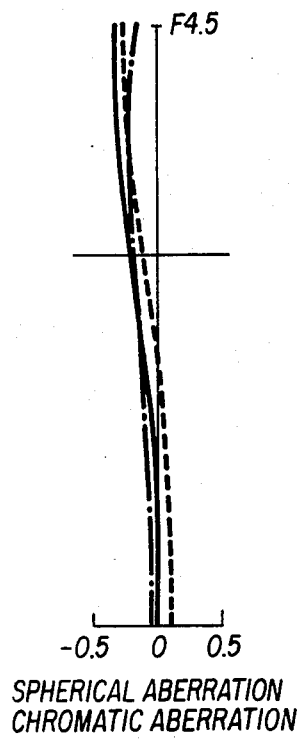
FIGS. 2 to 5 are diagrams showing various aberration curves of the facsimile lens system of FIG. 1, FIG. 2 showing the spherical aberration curve, FIG. 3 showing the astigmatism, FIG. 4 showing the distortion, and FIG. 5 showing the chromatic aberration.
Figure 3:
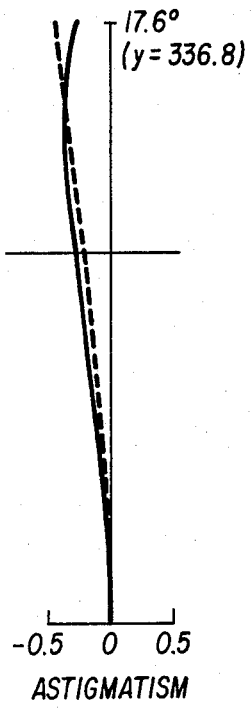
Figure 4:
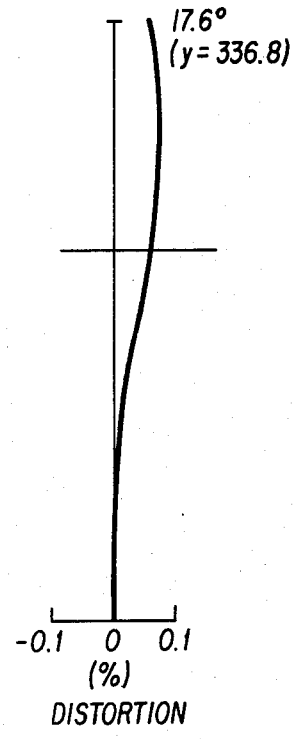

FIGS. 2 to 4 show various aberration curvatures of the above-mentioned embodiment. FIG. 2 shows the spherical aberration and chromatic aberration, in the diagram a solid line shows the e line, a broken line shows the d-line and a chained shows the g-line. FIG. 3 shows that the astigmatism of the height of the object at y = 336.8, in the FIG. 3 solid line represents the sagital ray, and broken line represents the merigional ray. FIG. 4 shows the distortion of the height of the object at y = 336.8.

As is clear from these diagrams spherical aberration and chromatic aberration are sufficiently corrected.

With astigmatism, the sagital ray is thoroughly coincident with the merigional ray. There is no astigmatic difference as both the sagital ray and the merigional ray overlap one another in the center of the best focussed surface. The distortion is smaller than 0.1 percent, which is sufficiently small.

Figure 5:
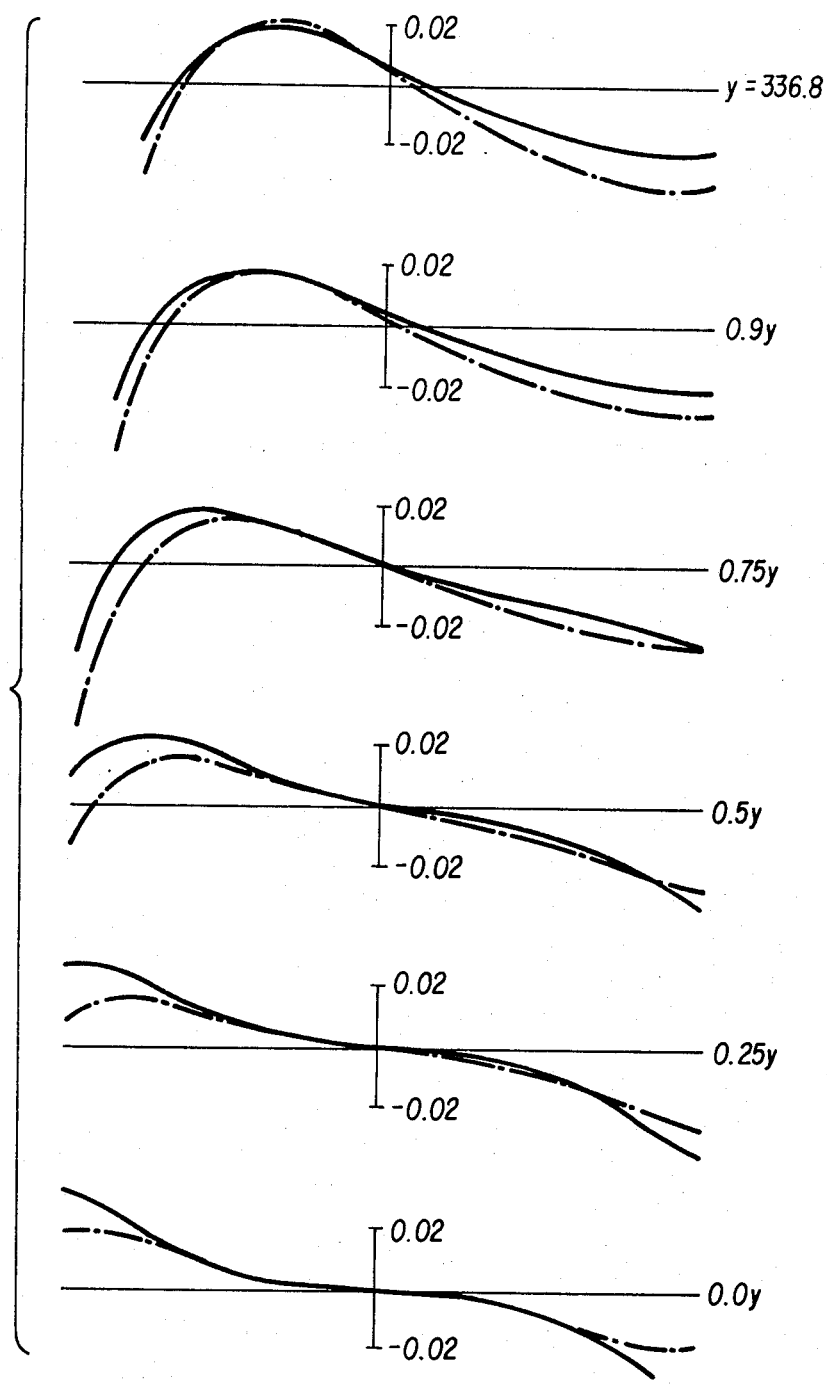

FIG. 5 shows the curvature of chromatic aberration. A high contrast is maintained from the center to most marginal part. In FIG. 5a, the solid line represents the e-line, and a chained line represent the g-line.

As is clear from these diagrams, the spherical aberration, the astigmatism, distortion as well as chromatic aberration are remarkably compensated for to provide a high contrast and a large aperture ratio facsimile lens system.

It is to be further understood that various modifications of the generic concepts of this invention are possible without departing from its spirit and accordingly the scope of the present invention should be determined solely from the following claims.

What is claimed is:

1. A tessor type lens system comprising a first positive meniscus lens element, a second biconcave lens element and a third cemented doublet element consisting of a negative lens element and positive lens element, said lens system having the following numerical data:

| | | | | | | |
|---|---|---|---|---|---|---|
| $\gamma$ = | ∞ | d = | 13.158 | n = 1.51633 | $\nu$ = 64.1 |
| $\gamma^1$ = | ∞ | $d^1$ = | 1039.145 | | |
| $\gamma_1$ = | 39.474 | $d_1$ = | 9.211 | $n_1$ = 1.77250 | $\nu_1$ = 49.6 |
| $\gamma_2$ = | 394.832 | $d_2$ = | 6.711 | | |
| $\gamma_3$ = | −97.368 | $d_3$ = | 5.395 | $n_2$ = 1.71736 | $\nu_2$ = 29.5 |
| $\gamma_4$ = | 34.697 | $d_4$ = | 7.369 | | |
| $\gamma_5$ = | −788.105 | $d_5$ = | 2.632 | $n_3$ = 1.58144 | $\nu_3$ = 40.7 |
| $\gamma_6$ = | 47.368 | $d_6$ = | 8.158 | $n_4$ = 1.83481 | $\nu_4$ = 42.7 |
| $\gamma_7$ = | −66.426 | $d_7$ = | 84.174 | | |
| $\gamma_8$ = | ∞ | $d_8$ = | 1.316 | $n_5$ = 1.77250 | $\nu_5$ = 49.6 |
| $\gamma_9$ = | ∞ | | | | | f = 100, F/4.5 wherein:

$\gamma_i$ represents the radius of curvature of the i-th refractive surface counted from the object side;

$d_i$ represents the i-th axial distance (i.e., airspace or lens thickness) counted from the object side;

$n_i$ represents the refractive index with respect to d-line of the i-th glass material counted from the object side;

$\nu_i$ represents the Abbe number of the i-th glass material counted from the object side;

f represents the focal length of the whole lens system.

* * * * *